(12) United States Patent
Murray et al.

(10) Patent No.: US 8,721,486 B2
(45) Date of Patent: May 13, 2014

(54) CONTINUOUSLY VARIABLE TRANSMISSION

(75) Inventors: Stephen William Murray, Lancashire (GB); Yusuke Okada, Aichi-ken (JP)

(73) Assignee: Torotrak (Development) Limited, Lancashire (GB)

( * ) Notice: Subject to any disclaimer, the term of this patent is extended or adjusted under 35 U.S.C. 154(b) by 169 days.

(21) Appl. No.: 13/140,919

(22) PCT Filed: Dec. 22, 2009

(86) PCT No.: PCT/GB2009/051758
§ 371 (c)(1),
(2), (4) Date: Feb. 1, 2012

(87) PCT Pub. No.: WO2010/073036
PCT Pub. Date: Jul. 1, 2010

(65) Prior Publication Data
US 2012/0172168 A1    Jul. 5, 2012

(30) Foreign Application Priority Data
Dec. 22, 2008  (JP) ................................ 2008-325767

(51) Int. Cl.
*F16H 37/02*  (2006.01)
(52) U.S. Cl.
USPC .......... 475/217; 475/207; 475/214; 475/215; 475/216; 475/218
(58) Field of Classification Search
USPC ......................... 475/207, 214–218
See application file for complete search history.

(56) References Cited

U.S. PATENT DOCUMENTS

| 6,979,276 B2* | 12/2005 | Murray ......................... 475/216 |
| 7,326,147 B2* | 2/2008 | Imanishi et al. .............. 475/216 |
| 2007/0275810 A1 | 11/2007 | Sinojima et al. | |

FOREIGN PATENT DOCUMENTS

| DE | 102007024466 A1 | 1/2008 |
| GB | 2369164 A | 5/2002 |

(Continued)

OTHER PUBLICATIONS

International Search Report; International Application No. PCT/GB2009/051758; mailed Jun. 24, 2010.

(Continued)

*Primary Examiner* — Derek D Knight
(74) *Attorney, Agent, or Firm* — Brooks Kushman P.C.

(57) ABSTRACT

A continuously variable transmission having a variator (5) comprising input discs (2) coupled to an input shaft (12) and an output disc (3) providing a rotary variator output. The input and output discs are mounted for rotation about a common axis and at last one roller (4) is arranged between the discs to transfer drive from one to the other at a continuously variable variator drive ratio. The roller is mounted in a carrier (30) in a manner which permits it to spin about its own axis and to tilt relative to the disks to vary the variator drive ratio. A hydraulic actuator (22) is arranged to apply to the carrier (30) a reaction force determined by a hydraulic pressure difference acting on the actuator. The reaction force opposes a traction force applied to the roller (4) by the action of the discs (2, 3). Power-recirculation gearing (6), preferably in the form of planetary gearing, receives as inputs the rotation of the input shaft (12) and the rotary variator output, and produces an output speed which is a function of both its inputs.

5 Claims, 5 Drawing Sheets

(56) References Cited

FOREIGN PATENT DOCUMENTS

| JP | 2000193078 | 7/2000 |
|----|------------|--------|
| JP | 2002156037 | 5/2002 |
| JP | 2006292079 A | 10/2006 |
| JP | 2007315507 | 12/2007 |
| JP | 2008249121 | 10/2008 |
| WO | 03100295 A1 | 12/2003 |
| WO | 2007003657 A1 | 1/2007 |

OTHER PUBLICATIONS

International Preliminary Report on Patentability; International Application No. PCT/GB2009/051758; date of issuance of report Jun. 29, 2011.

Japanese Office Action, corresponding Japanese application No. 2011-541607 dated Nov. 12, 2013. (no translation readily available.).

* cited by examiner (a)

(b)

(c)

(d)

CONTINUOUSLY VARIABLE TRANSMISSION

CROSS REFERENCE TO RELATED APPLICATION

This application is the U.S. national phase of PCT application no. PCT/GB2009/051758 filed 22 Dec. 2009 which claims priority to Japanese application JP 2008-325767 filed 22 Dec. 2008.

BACKGROUND OF THE INVENTION (1) Field of the Invention

The present invention relates to a continuously variable transmission, which is particularly, but not exclusively, suited to use in motor vehicles including automobiles. More specifically, the invention relates to a multi-regime continuously variable transmission which has improved responsiveness during regime switching.

(2) Description of Related Art

WO 03/100295 (Torotrak (Development) Limited et al) discloses a continuously variable transmission which employs a toroidal race variator and in which various members are disposed coaxially. This continuously variable transmission provides forward and reverse gears suitable for a vehicle, including geared neutral, by combining the variator with a planetary gear device whose output speed is determined by both (a) the variator's output speed and (b) the speed of the transmission's input shaft. The transmission employs torque recirculation.

The variator of WO 03/100295 comprises: two input disks each having semi-toroidally recessed surfaces; one output disk which is positioned between the input disks, and each side surface of which has a semi-toroidally recessed surface; and rollers which make contact with the facing recessed surfaces of the input disks and the output disk. The input disk on the input side (engine side) is secured to an input shaft, while the output disk is linked to a sleeve forming a rotary output which is positioned around the input shaft. A boss part on one of the input disks is inserted into the sleeve, the input shaft and the input-disk boss being linked to the same element (a carrier) of a planetary gear device, and the sleeve shaft being linked to another element (a sun gear) of the planetary gear device.

WO 07/003657 (Torotrak (Development) Limited et al) discloses a continuously variable transmission in which an "end stop" function is provided, to prevent the variator from going beyond the end of its intended ratio range, by means of one-way clutches which prevent the speed of a first shaft, which drives the transmission output in low regime, from exceeding the speed of a second output shaft, which drives the transmission output in high regime.

Japanese patent application 2006-292079 describes a continuously variable transmission which comprises a full-toroidal continuously-variable transmission device (a "variator"), a planetary gear mechanism, a reverse-rotation gear mechanism, and a low/high switching mechanism. The planetary gear mechanism has a carrier coupled to an input disk of the full-toroidal continuously-variable gearing device and to an input shaft, a first sun gear coupled to an output disk of the full-toroidal continuously-variable gearing device, a rear carrier constituting an output element in a low regime, and a second sun gear constituting an output element in a high regime. In the low regime rotation of the rear carrier is transmitted via the reverse-rotation gear mechanism to the output shaft. In the high regime the rotation of the second sun gear is transmitted via a high clutch to the output shaft. In low regime power is recirculated through the planetary gear mechanism, whose output speed is determined both by the speed of the input disk and that of the output disk. The transmission has a low/high switching mechanism for switching between (a) the low regime, involving the engagement of a low clutch, in which rotary drive is transmitted via the planetary gear mechanism, with power recirculation, to the output shaft, and (b) the high regime, involving the engagement of a high clutch, in which the rotary output of the continuously-variable gearing device is transmitted to the output shaft. The transmission has a hydraulic actuator for controlling the movement of the rollers. A pressure difference applied to the hydraulic servo determines the force it applies. The hydraulic actuator acts upon a rotation and inclination support part, providing a reaction force opposing the force of traction occurring at the rollers. The direction of the reaction force output by the hydraulic actuator is switched whenever switching takes place between the low regime and the high regime.

The switching timing for the clutch and other elements is normally as follows for configurational reasons. FIG. 5(a) is a graph of transmission ratio during regime change in a continuously variable transmission of the type under discussion; (b) is a graph illustrating changes in the state of engagement (contact) and disengagement of the low clutch used in the low regime; (c) is a graph illustrating changes in the state of engagement and disengagement of the high clutch used in the high regime; and (d) is a graph illustrating switching of the direction of the reaction force (the direction of the servo pressure difference) output by the hydraulic actuator used in roller position control.

In a vehicle equipped with this continuously variable transmission, regime switching will take place if, for instance, kick-down occurs while in the high regime in which the high clutch is engaged. In such situations, the system (at time t11) starts engagement of the low clutch which had previously been disengaged, and, once the engagement of the low clutch has been completed (time t12), it switches the direction of the reaction force (the direction of the pressure difference) of the hydraulic actuator (e.g. from 1 (MPa) towards −1 (MPa), although the magnitude of the force will typically be changed as well as its direction. Once the switching of the reaction force direction has been completed (time t13), the system starts disengagement of the high clutch which had until then been engaged. The transmission ratio is fixed at the "synchronous" ratio (−0.3 in the present example) while both clutches are engaged. After release of the old clutch (t14) changing of the transmission ratio resumes.

Because the gearing ratio is fixed during the regime switching between times t11 and t14 it follows that, despite the requirement for rapid gear changing across regimes at times such as kick-down, sluggish gear changes are liable to occur. Hence there is a pressing demand for regime switching to proceed more rapidly in order to achieve a prompt response to driver demands.

SUMMARY OF THE INVENTION

The present invention aims to provide a continuously variable transmission having improve responsiveness when rapid regime-switching is required, such as during kick-down.

In accordance with a first aspect of the present invention, there is a continuously variable transmission comprising
    a variator comprising an input disk coupled to an input shaft, an output disk providing a rotary variator output, the input and output disks being mounted for rotation about a common axis, at least one roller arranged between the two disks to transfer drive from one disk to the other at a continuously variable variator drive ratio, the roller being mounted in a carrier in a manner which permits it to spin about its own axis and to tilt relative to the disks to vary the variator drive ratio, and a hydraulic actuator arranged to apply to the carrier a reaction force determined by a hydraulic pressure difference acting on the actuator, the reaction force opposing a traction force applied to the roller by the action of the disks;

power-recirculation gearing which receives as inputs the rotation of the input shaft and the rotary variator output, and which produces an output speed which is a function of both its inputs;

a low/high switching mechanism which comprises a low clutch and a high clutch and which serves to switch between (a) a low regime in which the low clutch is engaged and the output of the power-recirculation gearing is transmitted to an output shaft, and (b) a high regime in which the high clutch is engaged and rotation of the variator output is transmitted to the output shaft, and wherein the direction of the reaction force of the hydraulic actuator is reversed during switching between low regime and high regime, the transmission being characterised in that it further comprises:

an engagement control which starts to engage the disengaged clutch (which may be the low clutch or the high clutch) when the transmission reaches a condition at which regime change is to be initiated; and a reaction force switching control which starts the reversal of the reaction force direction while the disengaged clutch is being engaged.

In accordance with a preferred embodiment of the invention, there is a continuously variable transmission, wherein the reaction force switching control completes the reversal of the direction of the reaction force before the complete engagement of the disengaged clutch.

According to a further preferred embodiment of the present invention, there is a continuously variable transmission, comprising a disengagement control which, once the reaction force direction has been reversed and the previously disengaged clutch is completely engaged, starts to disengage the clutch which had been engaged prior to the regime switch.

According to a further preferred embodiment of the present invention, there is a continuously variable transmission, further comprising a one-way clutch which is provided between the input-side member of the high clutch and an input-side member of the low clutch, and which prevents the rotational speed of the input-side member of the high clutch from becoming lower than the rotation speed of the input-side member of the low clutch.

According to a further preferred embodiment of the present invention, there is a continuously variable transmission, comprising a mechanism for reversing the rotational direction of the variator's rotary output before it is transmitted to the input-side member of the high clutch.

According to a further aspect of the present invention there is a continuously variable transmission (1) which comprises:
input disks ($2_1$ and $2_2$) coupled to an input shaft (12), an output disk (3) for outputting continuously variable geared rotation, rollers (4 and 4) sandwiched between the two disks ($2_1$, $2_2$ and 3), (respective} rotation and inclination support parts (30) for supporting the rotational centre (4a) of each roller in a freely rotatable fashion and also for supporting the said roller with freedom to incline relative to the two disks ($2_1$, $2_2$ and 3), and a full-toroidal continuously-variable gearing device (5) for autonomously changing the angle of inclination of the rollers by controlling the movement of the rollers (4 and 4) relative to the surface direction of the two disks ($2_1$, $2_2$ and 3) via the rotation and inclination support parts;

a hydraulic actuator (22) for controlling the movement of the rollers (4 and 4) between the two disks ($2_1$, $2_2$ and 3) by pressing and driving the rotation and inclination support part (30) on the basis of supplied hydraulic pressure;

a power-recirculation mechanism (6) which performs a power-recirculation operation in which the rotation of the input shaft (12) is synthesised with the continuously variable geared rotation; and a low/high switching mechanism (10) which is able to switch regimes between a low regime entailing the engagement of a low clutch (L) whereby rotation received via the power-recirculation mechanism (6) is freely transmitted to an output shaft (16), and a high regime entailing the engagement of a high clutch (H) whereby the continuously-variable geared rotation of the continuously-variable gearing device (5) is freely transmitted to the output shaft (16), and, in this said continuously variable transmission, a reaction force to traction produced by the rollers (4 and 4) is output by the hydraulic pressure of the hydraulic actuator (22) via the rotation and inclination support part (30), and also the direction of the reaction force output by the hydraulic actuator (22) is switched when the system switches between the low regime and the high regime, characterised in that the said continuously variable transmission (1) comprises:

an engagement control means (37) which starts engagement control for engagement of the disengaged clutch (which may be the high clutch (H) or the low clutch (L)) when the system reaches a switching point at which the regime should be switched; and a reaction force-switching control means (38) which controls the hydraulic pressure supplied to the hydraulic actuator (22) during the engagement control by means of the engagement control means (37), and thus starts reaction force-switching control for switching the direction of the reaction force.

Preferably, the reaction force—switching control means (38) completes the reaction force-switching control before completion of the engagement control by means of the engagement control means (37).

Preferably, the transmission further comprises a disengagement control means (43) which, once the reaction force-switching control and the engagement control have both been completed, starts disengagement control for disengaging the clutch which had been engaged prior to the regime switching.

Preferably, the transmission further comprises a reverse-rotation mechanism (7) for transmitting the continuously-variable geared rotation of the continuously-variable gearing device (5) to the input-side member (19) of the high clutch (H) after having first reversed the said rotation; and a one-way clutch (20) which is provided between the input-side member (19) of the high clutch (H) and an input-s member (17) of the low clutch (L), and which regulates the rotation of the input-side member (19) of the high clutch (H) becoming a lower rotation than the rotation of the input-side member (17) of the low clutch (L). It should be appreciated that the reference numbers in brackets above are for cross-referencing with the figures and are for convenience to facilitate understanding of the invention, and they do not in any way have any bearing on the scope of the claims.

Because the engagement control means starts engagement control for engagement of the disengaged clutch (the clutch on the disengaged side—which may be the high clutch or the low clutch) when the system reaches a switching point at which the regime should be switched, and the reaction force-switching control means controls the hydraulic pressure supplied to the hydraulic actuator during the engagement control by means of the engagement control means, and thus starts reaction force-switching control for switching the direction of the reaction force. Consequently (in contrast to the situation which pertains with the prior art technique in which the direction of the reaction force of the hydraulic actuator is switched only upon completing engagement of the previously disengaged clutch, which necessitates a lengthy period of time since control is carried out in such a way that the hitherto engaged clutch (clutch on the engaged side) is disengaged only after completing switching of the reaction force direction), when the present invention is employed, because the direction of the reaction force produced by the hydraulic actuator is switched during the engagement control of the clutch on the disengaged side, it is possible to rapidly start the process of disengaging the clutch on the engaged side following on from the switching of the direction of the reaction force, thereby improving responsiveness when rapid regime-switching is required, such as during kick-down.

Where the reaction force-switching control means completes the reaction force-switching control before completion of the engagement control by means of the engagement control means, and thus, subsequently, even if the clutch which had been engaged prior to the regime switching is disengaged, smooth gear changing without any shocks is achieved since reaction force-switching control has reliably been completed at that time.

Where the disengagement control means starts disengagement control for disengaging the clutch on the engaged side after the switching of the direction of the reaction force due to the hydraulic actuator and the engagement of the clutch on the disengaged side, and thus smooth and stable gear changing without any shocks is achieved.

Where the transmission comprises a reverse-rotation mechanism for transmitting the continuously-variable geared rotation of the continuously-variable gearing device to the input-side member of the high clutch after having first reversed the said rotation; and a one-way clutch which is provided between the input-side member of the high clutch and an input-side member of the low clutch, and which regulates the rotation of the input-side member of the high clutch becoming a lower rotation than the rotation of the input-side member of the low clutch, and it follows from this that, when the gearing ratio of the continuously-variable gearing device reaches the optimum value for regime switching, the system can start switching of the direction of the reaction force (orientation of the pressure difference) due to the hydraulic actuator and start engagement of the clutch on the previously disengaged side, and hence regime switching can be carried out both promptly and smoothly without producing any shock.

BRIEF DESCRIPTION OF THE DRAWINGS

A specific embodiment of the present invention will now be described, by way of example only, with reference to the accompanying drawings, in which.

DETAILED DESCRIPTION OF THE PREFERRED EMBODIMENT

Figure 1A:
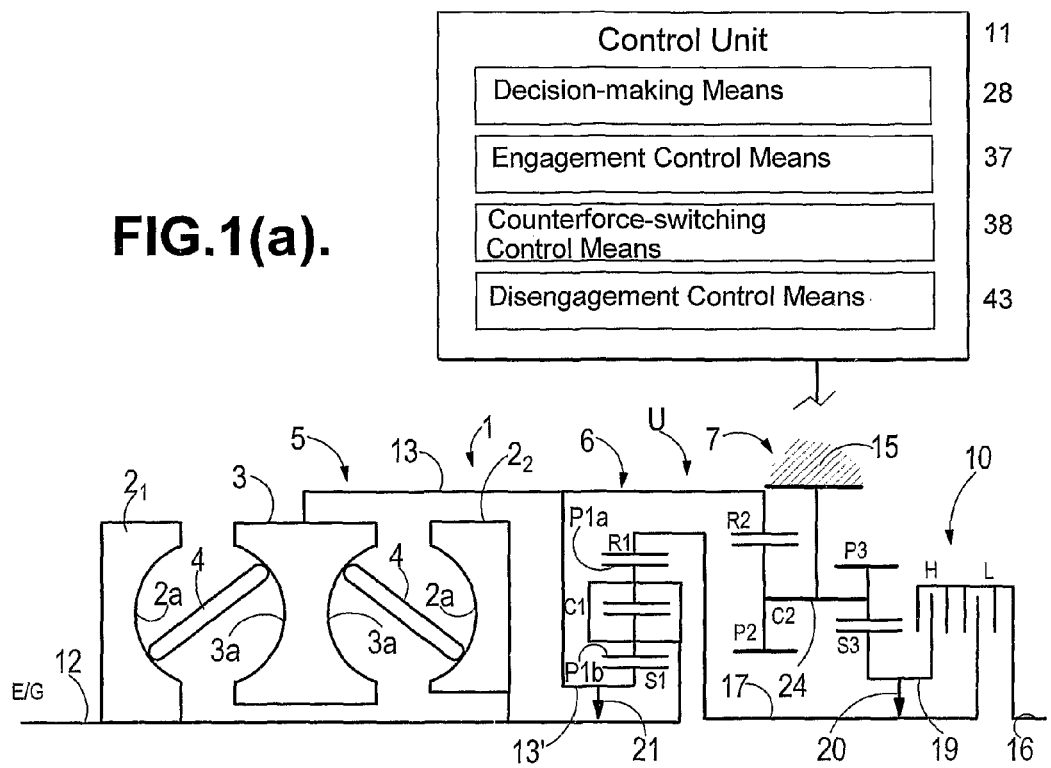
FIG. 1(a) is a schematic representation of a continuously variable transmission (CVT) comprising a full-toroidal continuously-variable gearing device according to the present invention.

As shown in FIG. 1(a), a continuously variable transmission 1 comprises: a full-toroidal continuously-variable gearing device (also referred to hereinbelow as a variator) 5; a planetary gear device U comprising a power-recirculation mechanism 6 and a reverse-rotation gear mechanism 7; and a low/high switching mechanism 10. A traction produced by rollers 4 and 4 is reacted through hydraulic actuator 22 acting through a carriage 30, and determined by hydraulic pressure in the actuator. The direction of the reaction force exerted by the hydraulic actuator 22 is switched when the system switches between low regime and high regime.

The continuously-variable gearing device 5 has: two input disks $2_1$ and $2_2$ coupled to an input shaft 12; a single output disk 3 located between the two input disks $2_1$ and $2_2$ for outputting continuously variable geared rotation; and rollers 4 and 4 sandwiched between the two disks $2_1$, $2_2$ and 3.

It should be noted that the input disks $2_1$ and $2_2$ are also collectively referred to hereinbelow as the input disk or input disks 2. The input disks $2_1$ and $2_2$ and the output disk 3 have facing semi-toroidal recesses 2a and 3a forming a pair of toroidal cavities containing the two sets of rollers 4 and 4. The rollers 4 transmit drive from the input disks to the output disks (or from the output disks to the input disks, since power can flow through the variator in either direction) at a continuously variable drive ratio (the ratio of input disk speed to output disk speed). The rollers are able to tilt, changing their inclination, when moved in a direction at right angles to their axes, thereby altering their contact radii with the input disks $2_1$ and $2_2$ and the output disk 3, and so altering the drive ratio. A drum-shaped output transmission shaft 13 is coupled to the circumferentially outermost portion of the output disk 3, and the said output transmission shaft 13 extends to the rear of the variator, surrounding the rear input disk $2_2$.

The power-recirculation mechanism 6 performs a power-recirculation operation in which the rotation of the input shaft 12 is combined with the continuously variable rotation output from the output disk 3, and it comprises, in a dual planetary gear arrangement, a carrier C1 for supporting a first pinion P1a and a second pinion P1b which mesh with each other, a ring gear R1 which meshes with the first pinion P1a, and a sun gear S1 which meshes with the second pinion P1b.

The carrier C1, which is linked to the input shaft 12 which is itself linked to the output shaft 8a (see FIG. 2) of an engine 8 via a torque converter 9, is used for the transmission of the output of the engine 8. The sun gear S1, which is linked to the abovementioned drum-shaped output transmission shaft 13, is used for the transmission of the continuously-variable output rotation output of the variator 5. The ring gear R1 outputs power to the low clutch L of the low/high switching mechanism 10.

The reverse-rotation gear mechanism 7 is used to transmit the continuously-variable geared rotation of the variator 5 to the high transmission shaft 19 of the high clutch H after having first reversed the said rotation. It comprises two pinions P2 and P3, one large and the other small, which are secured to a shaft 24 rotatably supported on a securing member 15, in a step pinion arrangement. The large pinion P2, which meshes with a ring gear R2 secured to the output transmission shaft 13, is used to transmit the output rotation of the variator 5, while the small pinion P3, which meshes with a sun gear S3, outputs power to the high clutch H of the low/high switching mechanism 10. The reverse-rotation gear mechanism 7 is effectively a planetary gear whose carrier C2 is fixed.

The low/high switching mechanism 10 is configured in such a way as to be able to switch regimes between:
  (a) a low regime in which the low clutch L is engaged and rotation received via the power—recirculation mechanism 6 is transmitted to an output shaft 16, and
  (b) a high regime in which the high clutch H is engaged and the continuously-variable output of the variator 5 is transmitted to the output shaft 16.

In other words, the low/high switching mechanism 10 comprises the low clutch L whereby output rotation from the power-recirculation mechanism 6 is transmitted via a low-transmission shaft (input-side member of the low clutch L) 17, and the high clutch H whereby output rotation from the reverse-rotation gear mechanism 7 is transmitted via a sleeve-shaped high-transmission shaft (input-side member of the high clutch H) 19. The variator 5, planetary-gear device U and low/high switching mechanism 10 and also the input shaft 12 and output shaft 16 are coaxial.

A one-way clutch 20 is provided between the high-transmission shaft 19 of the high clutch H and the low-transmission shaft 17 of the low clutch L. This one-way clutch 20 prevents the rotation of the high-transmission shaft 19 from becoming slower than the rotation of the low-transmission shaft 17, and so limits the gearing ratio of the variator 5. The one-way clutch freewheels whilst the high-transmission shaft 19 is turning faster than the low-transmission shaft 17, but locks to prevent the low-transmission shaft 17 from turning faster than the high-transmission shaft 19. It may for example be formed as a sprag clutch.

Figure 2:
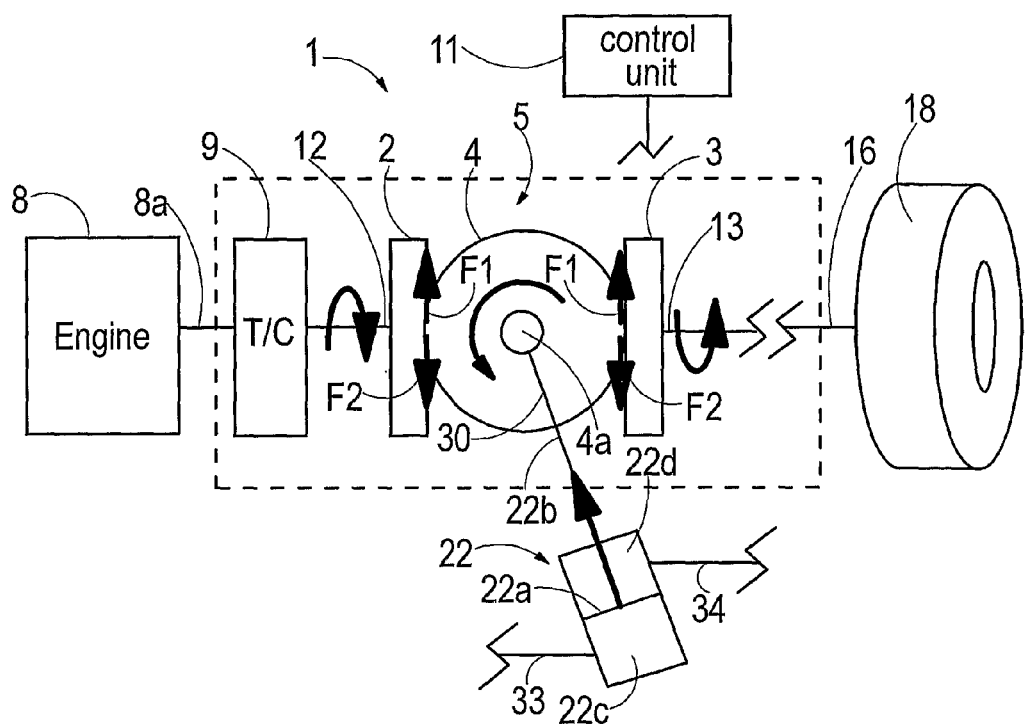
FIG. 2 represents certain working parts of the same transmission in a highly diagrammatic form.

As shown in FIG. 2, the variator 5 has: a carriage (rotation and inclination support part) for supporting the roller 4, permitting the roller to spin about its own axis, and also to incline relative to the two disks $2_1$ and $2_2$ and 3; and a hydraulic actuator 22 for applying a controllable force to the carriage 30 on the basis of hydraulic pressure supplied from a hydraulic-pressure control device which is not depicted. The hydraulic actuator 22 has opposed hydraulic chambers 22c and 22d which are partitioned from each other by a piston 22a, and has a piston rod 22b which is linked via the carriage 30 to the axis 4a of the roller 4. The angle of inclination of the rollers 4 and 4 is autonomously changed by controlling the movement of the rollers 4 and 4 relative to the surface direction of the two disks $2_1$, $2_2$ and 3 via the carriage 30. Reference number 18 in FIG. 2 denotes a driven vehicle wheel which is turned by the drive force which is transmitted from the continuously variable transmission 1, via the output shaft 16 and a differential gear (which is not depicted).

During torque transmission from the input disk 2 to the output disk 3 due to engagement of the high clutch H, a pressure—regulating valve (not depicted) is connected via a hydraulic pathway 33 to the hydraulic chamber 22c in such a way that the hydraulic chamber 22c can output, via the carriage 30, a reaction force (a force urging the roller 4 downwards in FIG. 2) against a traction force F1 (see FIG. 2) which acts on each roller 4 under such conditions. During torque transmission from the output disk 3 to the input disk 2 via the power-recirculation mechanism 6 due to engagement of the low clutch L, a pressure-regulating valve (not depicted) is connected via a hydraulic pathway 34 to the hydraulic chamber 22d in such a way that the hydraulic chamber 22d can output, via the carriage 30, a reaction force (a force urging the roller 4 upwards in FIG. 2) against a traction force F2 (see FIG. 2) which acts on each roller 4 under such conditions.

As shown in FIG. 1(a), a control unit 11 for controlling the continuously variable transmission 1 has a decision-making means 28, an engagement control means 37, a reaction force-switching control means 38, 30 and a disengagement control means 43.

The decision-making means 28 monitors the drive ratio of the variator 5 and makes a decision as to whether the said drive ratio has reached a regime-switching optimum value (i.e. a point at which the regime should be switched), and also determines whether the low clutch L is currently connected. When a decision has been made by the decision-making means 28 that the system has reached a point at which the regime should be switched, the engagement control means 37 starts to engage the disengaged clutch (which may be the high clutch H or the low clutch L). Engagement of the clutch is carried out by supplying hydraulic pressure to a hydraulic actuator (not depicted) acting on the clutch to be engaged (which may be the high clutch H or the low clutch L), by controlling a hydraulic-pressure control device (not depicted) by means of the engagement control means 37.

While the clutch is being engaged by the engagement control means 37, the reaction force-switching control means 38 controls the hydraulic pressure supplied to the hydraulic actuator 22, through a hydraulic-pressure control device which is not depicted, and thus starts the process of switching the direction (differential pressure direction) of the reaction force which is output by the hydraulic actuator 22. Switching of the direction of the reaction force is completed before the oncoming clutch is fully engaged. When the switching of the reaction force and the engagement of the oncoming clutch have been completed, the disengagement control means 43 exhausts hydraulic pressure from a hydraulic actuator (not depicted) of the old clutch which was engaged before the regime switching (which may be the high clutch H or the low clutch L), and thus starts to disengage the said clutch.

As shown in FIG. 1(a), a one-way clutch 21 for preventing backward rotation is provided between the input shaft 12 and a sun gear shaft 13' which is integral with the drum-shaped output transmission shaft 13. The input shaft 12 which is coupled with the input disk 2 ($2_1$ and $2_2$), and the sun gear shaft 13' which is coupled to the output disk 3 always rotate in the opposite direction to each other whatever the drive ratio of the variator 5. Since the direction of rotation of the engine 8 is fixed (by way of example, being assumed here to be clockwise), the one-way clutch 21 is set so as to rotate idly when the input shaft 12 turns clockwise and the sun gear shaft 13' turns anticlockwise.

Upon launch (moving away from rest) of the vehicle, or while reversing, the continuously variable transmission 1 is put into the low-regime state by engaging the low clutch L by means of the engagement control means 37 and disengaging the high clutch H by means of the disengagement control means 43 under control by the 20 low/high switching mechanism 10, based on hydraulic control by means of elements including a shift lever and the hydraulic-pressure control device which are not depicted. Thereupon, as shown in FIGS. 1(a) and (b), the rotation of the input shaft 12 coupled to the output shaft 8a of the engine 8 is transmitted to the input discs $2_1$ and $2_2$ of the variator 5 and the carrier C1 of the power-recirculation mechanism 6. The rotation of the input shaft 12, which is input to the input discs $2_1$ and $2_2$, undergoes a speed change in the variator 5, and the variator output rotation Vout is output by means of the output disk 3 and passes via the output transmission shaft 13 to the sun gear S1 and the ring gear R2.

When the variator output rotation Vout is input to the sun gear S1, a combination takes place in the power-recirculation mechanism 6, in the form of torque recirculation of the rotation of the input shaft 12 input to the carrier C1 and the abovementioned variator output rotation Vout of the sun gear S1, and the result is output from the ring gear R1. The output rotation of the ring gear R1 constitutes an output rotation OutL. It is variable through a range extending from stepped-down reverse rotation, via a neutral position (the Geared Neutral point, GN), to stepped-down forward rotation, in accordance with the drive ratio of the variator 5. The output rotation OutL of the ring gear R1 is output, in the form of output rotation in the low-regime state, via the low transmission shaft 17 and the low clutch L, to the output shaft 16.

In low regime power is recirculated through the power-recirculation mechanism 6. When the variator output rotation Vout (drive ratio of the variator 5) is in the geared-neutral state GN illustrated in FIG. 1(b) by the single dot and chain line, and the transmission is in low regime, the ring gear R1 is stationary. The output rotation OutL is zero. The vehicle can be brought to a halt and subsequently launched without disengaging the low clutch L and a launch device such as a torque converter can be dispensed with.

Selection of reverse (R) and forward drive (D) may be made using a shift lever (not shown). In reverse (which is available in low regime only), the output speed OutL of the output shaft 16 is increased (faster reverse rotation) when the drive ratio of the variator 5 is increased (if, in FIG. 1(b), the variator output rotation Vout is slowed).

Figure 1B:
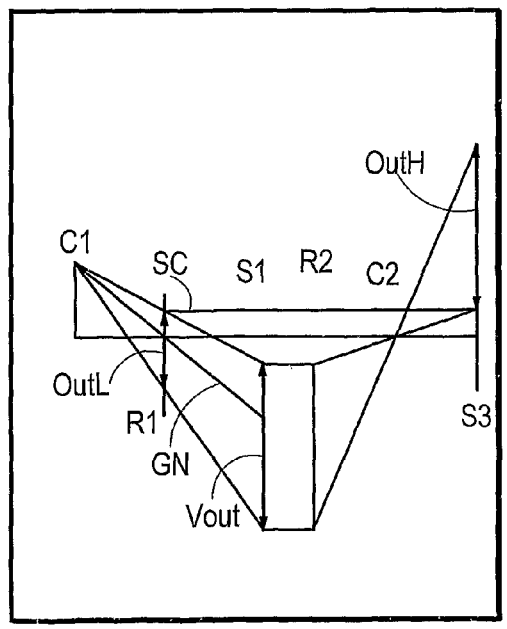
FIG. 1(b) is a velocity diagram for parts of the FIG. 1a transmission.

In the drive (D) range, in low regime, the output speed OutL of the output shaft 16 is increased when the drive ratio of the variator 5 is reduced (if, in FIG. 1(b), the variator output rotation Vout is speeded up).

As the vehicle accelerates forwards from rest, the output speed OutL of the output shaft 16 in low-regime is increased while the drive ratio of the variator 5 is reduced. When the variator 5 reaches the gearing ratio for a synchronous regime change (Sc in FIG. 1b) and a regime-change decision is taken, the low/high switching mechanism 10 is controlled on the basis of hydraulic-pressure control by means of the hydraulic-pressure control device which is not depicted. The high clutch H is engaged by means of the engagement control means 37 and the low clutch L is disengaged by means of the disengagement control means 43, whereupon the toroidal continuously variable transmission 1 is put into the high-regime state.

At this juncture, as shown in FIGS. 1(a) and (b), in high-regime, the variator output rotation Vout is input to the ring gear R2 of the reverse-rotation gear mechanism 7, and the rotation which has been input to the ring gear R2 passes via the large and small pinions P2 and P3. Due to the gear ratios R2/P2 and S3/P3, the variator output rotation Vout is changed to slightly stepped up rotation and is reversed before being output from the sun gear S3. The rotation of the sun gear S3 is output via the high-transmission shaft 19 and the high clutch H to the output shaft 16, providing the transmission's output in high-regime. The transmission operates without power-recirculation, its output speed being determined by the variator output rotation Vout. The power-recirculation mechanism 6 is removed from the power transmission path.

The synchronous change from low-regime to high-regime during the abovementioned synchronous regime change is carried out when the drive ratio of the variator 5 (the variator output rotation Vout) is at its minimum.

Situations can arise where the variator tends to go beyond the synchronous ratio. Note that synchronous ratio is the variator drive ratio at which a regime change produces no change in the transmission's output speed. That is, at synchronous ratio the high-transmission shaft 19 and the low-transmission shaft 17 rotate at the same speed. At all other permissible variator ratios the high-transmission shaft 19 rotates faster than the low-transmission shaft 17. External causes, such as the vehicle running on sloping roads, or rapid braking, can tend to cause the speed of the low-transmission shaft to exceed that of the high-transmission shaft.

For example, in low regime, if the ratio of the speed of the output shaft 16 to that of the input shaft 12 (the ratio of the speed of the vehicle's drive wheel 18, 20 to the engine speed) becomes large and attempts to become larger in the positive direction than the upper end of the range OutL shown in FIG. 1(b), then the low-transmission shaft 17 and the high-transmission shaft 19, which are coupled through the power-recirculation mechanism 6 and the reverse-rotation gear mechanism 7, enter a state in which their rotations approach each other and, once they have reached the same speed, the one-way clutch 20 is engaged.

When the one-way clutch 20 is engaged in low regime in this way, the speed of the high-transmission shaft 19 is prevented from becoming lower than that of the low-transmission shaft 17, and thus the drive ratio of the variator 5 is prevented from exceeding the abovementioned synchronous ratio Sc. Consequently the rollers 4 and 4 are prevented from becoming excessively inclined, thereby preventing problems such as the rollers flying off the two discs 2 and 3.

Similarly in high regime if the ratio of the speed of the output shaft 16 to that of the input shaft 12 (the ratio of the speed of the vehicle's driven wheel to the engine speed) becomes small and attempts to become smaller in the positive direction than the lower end of the output range OutH shown in FIG. 1(b), then the low-transmission shaft 17 and the high-transmission shaft 19, which are coupled through the power-recirculation mechanism 6 and the reverse-rotation gear mechanism 7, enter a state in which their rotations approach each other and, once they have reached the same speed, the one-way clutch 20 is engaged. This similarly prevents problems such as the rollers 4 and 4 flying off the two discs 2 and 3.

The present invention can thus prevent situations such as dropout of a roller 4 as the speed of the low-transmission shaft 17 exceeds that of the high-transmission shaft 19 during regime switching, due to the presence of the one-way clutch 20. Hence when the gearing ratio of the variator 5 reaches the optimum value for regime switching, the system can start switching the direction of the reaction force (orientation of the pressure difference) of the hydraulic actuator 22 and start engagement of the clutch on the previously disengaged side (which may be the high clutch H or the low clutch L). In this way, regime switching can be carried out both promptly and smoothly without creating any shock.

Further, whatever the variator drive ratio may be, when the input discs $2_1$ and $2_2$ of the variator 5 rotate in the forward-rotation direction (e.g. clockwise) and the roller 4 is driven in rotation in response, the sun gear shaft 13' coupled to the output disk 3 does not rotate in the forward-rotation direction (e.g. clockwise) faster than the input shaft 12 linked to the input disk 2, but rather the one-way clutch 21 located between the two shafts 12 and 13' rotates idly. By way of example, if the roller 4 is driven in rotation in the reverse direction, for example upon input of reverse torque to the variator 5 from the vehicle drive wheel 18 when the vehicle is at a halt on an uphill slope or upon backward rotation of the engine 8 (slight backward rotation when the engine 8 is stopped), then the sun gear shaft 13' rotates fast in the forward-rotation direction (clockwise) relative to the input shaft 12, and the one-way clutch 21 is locked such that backward rotation of the input disk 2 is inhibited. In this way, the roller 4 is driven in rotation in the backward direction, the fraction force of the roller is relieved, and situations where the roller drops out are prevented before they can arise.

Figure 3:
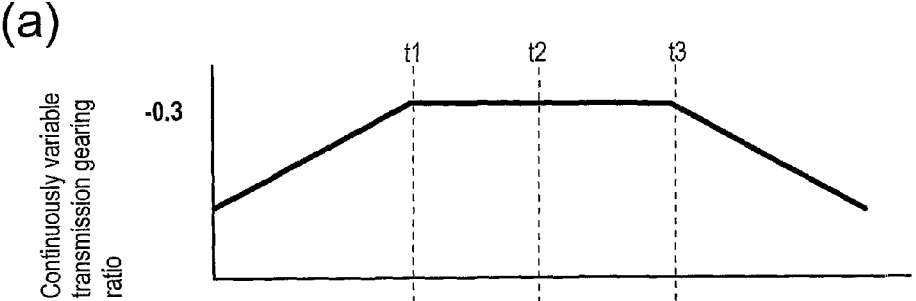
FIG. 3(a) is a graph of changes in the gearing ratio of the continuously variable transmission.
FIG. 3(b) is a graph of changes in the state of engagement (contact) and disengagement of the low clutch used in low regime.
FIG. 3(c) is a graph of changes in the state of engagement and disengagement of the high clutch used in the high regime.
FIG. 3(d) is a graph illustrating the situation on switching the direction of the reaction force (direction of the differential pressure) output by the hydraulic actuator 22.
Figure 3:
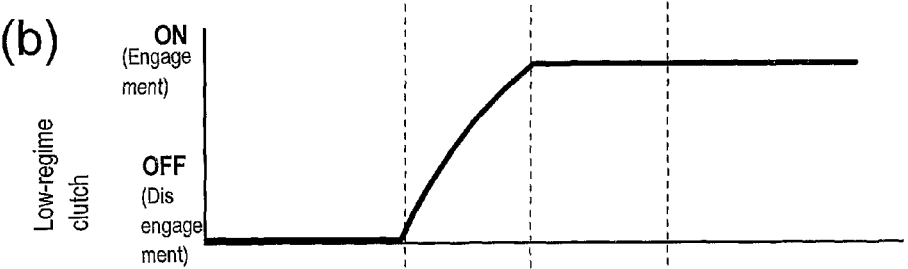
Figure 3:
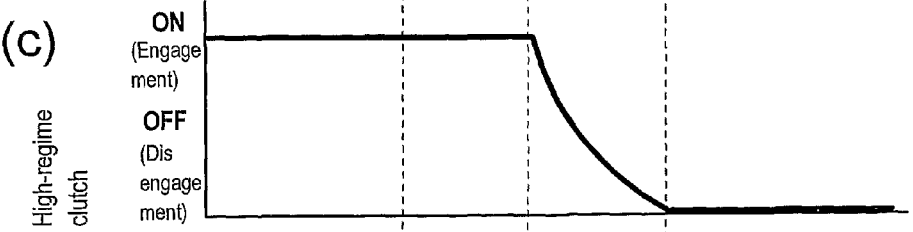
Figure 3:
Figure 4:
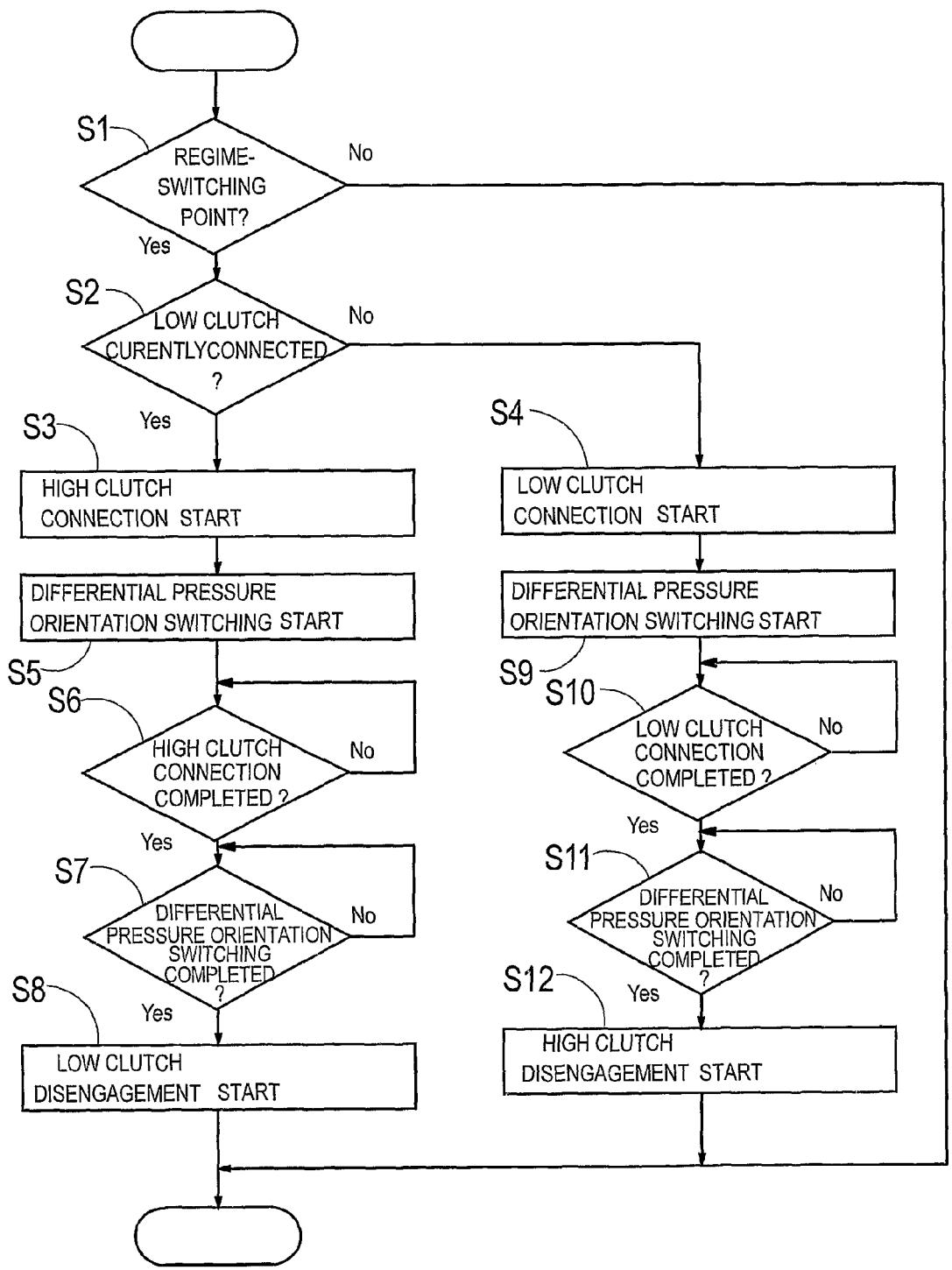
FIG. 4 is a flow diagram of operations upon regime change.
Figure 5:
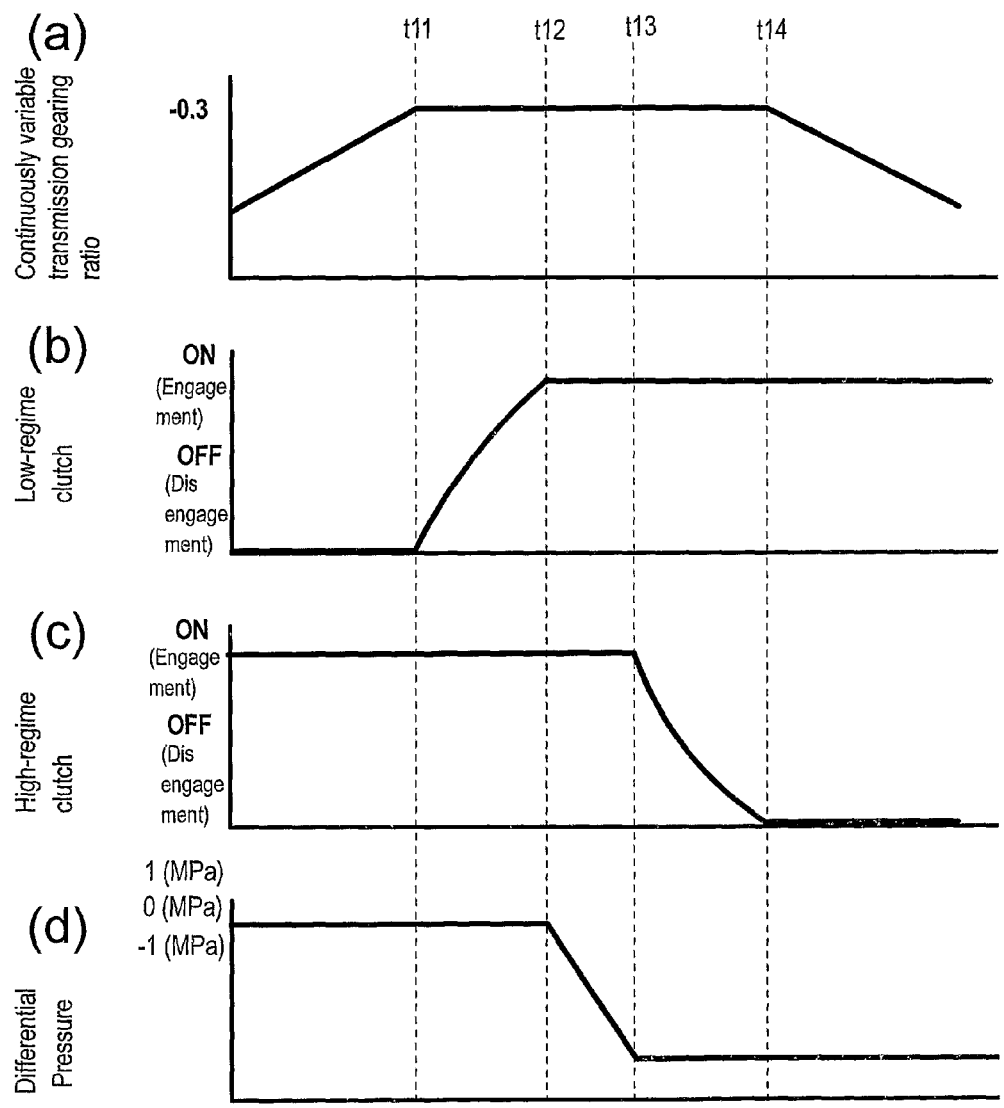
FIG. 5(a) is a graph of transmission ratio during regime change in a known continuously variable transmission.
FIG. 5(b) is a graph illustrating changes in the state of engagement (contact) and disengagement of the low clutch used in the low regime.
FIG. 5(c) is a graph illustrating changes in the state of engagement and disengagement of the high clutch used in the high regime.
FIG. 5(d) is a graph illustrating switching of the direction of the reaction force (orientation of the pressure difference) output by the hydraulic actuator used in roller position control.

The switching timing of elements such as the clutch are detailed hereinbelow. FIG. 3(a) is a graph illustrating changes in the drive ratio of the continuously variable transmission 1; (b) is a graph illustrating changes in the state of engagement (contact) and disengagement of the low clutch used in the low regime; (c) is a graph illustrating changes in the state of engagement and disengagement of the high clutch used in the high regime; and (d) is a graph illustrating the situation on switching the direction of the reaction force (direction of the differential pressure) output by the hydraulic actuator 22. Further, FIG. 4 is a flow chart explaining the operation of the present embodiment.

In a vehicle equipped with the present continuously variable transmission 1, in Step S1, if the decision-making means 28 makes a decision that the drive ratio of the variator 5 has reached a switching point at which the regime should be switched (S1: YES), then, in Step S2, it determines whether the low clutch L is currently connected. If it determines that the low clutch L is connected (S2: YES), then the engagement control means 37 supplies hydraulic pressure to a corresponding hydraulic actuator (not depicted) and, in Step S3, it starts engagement of the high clutch H which had been disconnected and, in Step S5, it starts switching the reaction force direction (differential pressure direction) of the hydraulic actuator 22. Then, in Step S6, the engagement control means 37 determines whether engagement of the high clutch H has been completed, and, once it has determined that the connection has been completed (S6: YES), the reaction force-switching control means 38 determines, in Step S7, whether or not the switching of the reaction force direction (which was started in Step S5) has been completed. If it determines that the switching of the reaction force direction has been completed (S7: YES), then the disengagement control means 43 starts (S8) disengagement of the low clutch L by exhausting hydraulic pressure from the corresponding hydraulic actuator (not depicted), and the process is completed at the time when the disengagement takes place.

On the other hand when, by way of example, kick-down takes place during running using the high clutch H, then if, in Step S1, the decision-making means 28 makes the decision that a switching point has been reached (S1: YES) and, in Step S2, it determines that the high clutch H is connected rather than the low clutch L being connected (S2: No), then the engagement control means 37 supplies hydraulic pressure to the corresponding hydraulic actuator (not depicted) and, in Step S4, it starts engagement (at the time t1 in FIG. 3) of the low clutch L which had been disengaged and, in Step S9, it starts switching (time t1) of the reaction force direction of the hydraulic actuator 22 (e.g. from 1 [MPa] towards −1 [MPa]).

Also, the engagement control means 37 determines in Step S10 whether the connection of the low clutch L has been completed and, if it determines that the connection has been completed (S10: YES) (time t2), the reaction force-switching control means 38 determines, in Step S11, whether or not the switching of the reaction force direction (which was started in Step S9) has been completed. If it determines that the switching of the reaction force direction has been completed (S11: YES), then, in Step S12, the disengagement control means 43 carries out (time t2) a process for starting disengagement of the high clutch H by exhausting hydraulic pressure from the corresponding hydraulic actuator (not depicted). Upon completion (time t3) of disengagement of the high clutch H, the transmission ratio can once more be increased from the state at times t1 to t3 when the gearing ratio had been fixed at a constant (−0.3).

As described hereinabove, the present embodiment is configured in such a way that, when the engagement control means 37 decides that the system has reached a switching point at which the regime should be switched, it starts engagement control for engaging the previously disengaged clutch (which may be the high clutch H or the low clutch L), and the reaction force switching control means 38 starts reaction force-switching control whereby the hydraulic pressure supplied to the hydraulic actuator 22 is controlled and the direction of the reaction force is switched during the engagement control by means of the engagement control means 37. Consequently (in contrast to the situation which pertains when the direction of the reaction force of the hydraulic actuator 22 is switched only upon completing engagement of the previously disengaged clutch, which requires a lengthy period of time since control is carried out in such a way that the hitherto engaged clutch is disengaged only after completing switching of the reaction force direction), when the present mode of embodiment is employed, the reaction force switching means 38 is used to switch the direction of the reaction force produced by the hydraulic actuator 22 during the engagement control of the clutch on the disengaged side by means of the engagement-control means 37, and thus it is possible to rapidly start the process of disengaging the clutch on the engaged side following the switching of the direction of the reaction force. This improves responsiveness when rapid regime-switching is required, such as during kick-down.

Further, in the present embodiment, because the reaction force switching control means 38 completes the reaction force-switching control before completion of the engagement control by means of the engagement control means 37, it follows that, subsequently, when disengaging the clutch which had been engaged prior to the regime switching, smooth gear changing without any shocks is achieved since reaction force-switching control has reliably been completed at that time. Further, because the disengagement control means 43 starts disengagement control for disengaging the clutch on the engaged side after the switching of the direction of the reaction force due to the hydraulic actuator 22 and the engagement of the clutch on the disengaged side, it follows that smooth and stable gear changing without any shocks is achieved.

The invention claimed is:

1. A continuously variable transmission comprising
a variator comprising an input disk coupled to an input shaft, an output disk providing a rotary variator output, the input and output disks being mounted for rotation about a common axis, at least one roller arranged between the two disks to transfer drive from one disk to the other at a continuously variable variator drive ratio, the roller being mounted in a carrier in a manner which permits it to spin about its own axis and to tilt relative to the disks to vary the variator drive ratio, and a hydraulic actuator arranged to apply to the carrier a reaction force determined by a hydraulic pressure difference acting on the actuator, the reaction force opposing a fraction force applied to the roller by the action of the disks;
power-recirculation gearing which receives as inputs the rotation of the input shaft and the rotary variator output, and which produces an output speed which is a function of both its inputs;
a low/high switching mechanism which comprises a low clutch and a high clutch and which serves to switch between (a) a low regime in which the low clutch is engaged and the output of the power-recirculation gearing is transmitted to an output shaft, and (b) a high regime in which the high clutch is engaged and rotation of the variator output is transmitted to the output shaft, and wherein
the direction of the reaction force of the hydraulic actuator is reversed during switching between low regime and high regime, the transmission comprising:
an engagement control which starts to engage a disengaged clutch (which may be the low clutch or the high clutch) when the transmission reaches a condition at which regime change is to be initiated; and
a reaction force switching control which starts the reversal of the reaction force direction while the disengaged clutch is being engaged.

2. A continuously variable transmission as claimed in claim 1, wherein the reaction force switching control completes the reversal of the direction of the reaction force before the complete engagement of the disengaged clutch.

3. A continuously variable transmission as claimed in claim 1, comprising a disengagement control which, once the reaction force direction has been reversed and the previously disengaged clutch is completely engaged, starts to disengage the clutch which had been engaged prior to the regime switch.

4. A continuously variable transmission as claimed in claim 1, further comprising a one-way clutch which is provided between an input-side member of the high clutch and an input-side member of the low clutch, and which prevents a rotational speed of the input-side member of the high clutch from becoming lower than a rotation speed of the input-side member of the low clutch.

5. A continuously variable transmission as claimed in claim 1 comprising
a mechanism for reversing the rotational direction of a rotary output of the variator before it is transmitted to an input-side member of the high clutch.

\* \* \* \* \*

UNITED STATES PATENT AND TRADEMARK OFFICE
CERTIFICATE OF CORRECTION

| | | |
|---|---|---|
| PATENT NO. | : 8,721,486 B2 | Page 1 of 1 |
| APPLICATION NO. | : 13/140919 | |
| DATED | : May 13, 2014 | |
| INVENTOR(S) | : Stephen William Murray et al. | |

It is certified that error appears in the above-identified patent and that said Letters Patent is hereby corrected as shown below:

On the Title Page of the patent:
Delete:
"(73) Assignee: Torotrak (Development) Limited, Lancashire (GB)"
and insert
-- (73) Assignee: Torotrak (Development) Limited, Lancashire (GB) and Equos Research Co., Ltd, Tokyo (JP). --

In the Claims:
Column 14, Line 25, Claim 4:
After "lower than a" delete "rotation" and
insert -- rotational --.

Signed and Sealed this
Twenty-eighth Day of October, 2014

Michelle K. Lee
*Deputy Director of the United States Patent and Trademark Office*